June 20, 1961

P. F. BURCH 2,989,105

HOG SIDE SKINNING MACHINE HAVING PNEUMATICALLY OPERATED CLAMP BAR

Filed Oct. 22, 1958

INVENTOR.
Paul F. Burch
BY
ATTORNEY.

June 20, 1961

P. F. BURCH 2,989,105

HOG SIDE SKINNING MACHINE HAVING
PNEUMATICALLY OPERATED CLAMP BAR

Filed Oct. 22, 1958

INVENTOR.
Paul F. Burch
BY
ATTORNEY.

United States Patent Office 2,989,105
Patented June 20, 1961

2,989,105
HOG SIDE SKINNING MACHINE HAVING PNEU-
MATICALLY OPERATED CLAMP BAR
Paul F. Burch, Rockford, Mich., assignor to Wolverine Shoe and Tanning Corporation, Rockford, Mich.
Filed Oct. 22, 1958, Ser. No. 768,930
4 Claims. (Cl. 146—130)

This invention relates to improvements in hog side skinning machine. The invention involves improvements in the hog side skinning machines shown in Patents 2,649,881 and 2,681,675 issued respectively to Runnells and Burch jointly, and to Paul F. Burch individually. The principal objects of the invention are:

First, to provide a hog side skinning machine that will grip a hog side adjacent to one edge thereof without damaging the skin thereby increasing the amount of skin recovered for leather.

Second, to provide a machine of the type described in which the hog side is gripped by mechanism operating by externally developed pneumatic force so that a firm grip on the work is assured without piercing the skin of the work.

Third, to provide a mounting for a work gripper on a hog side skinning machine that automatically strips the hog side engaged by the gripper from the gripper when the gripper is released.

Other objects and advantages of the invention will be apparent from a consideration of the following description and claims. The drawings, of which there are two sheets, illustrate a highly practical form of the invention.

Figures 1, 2:
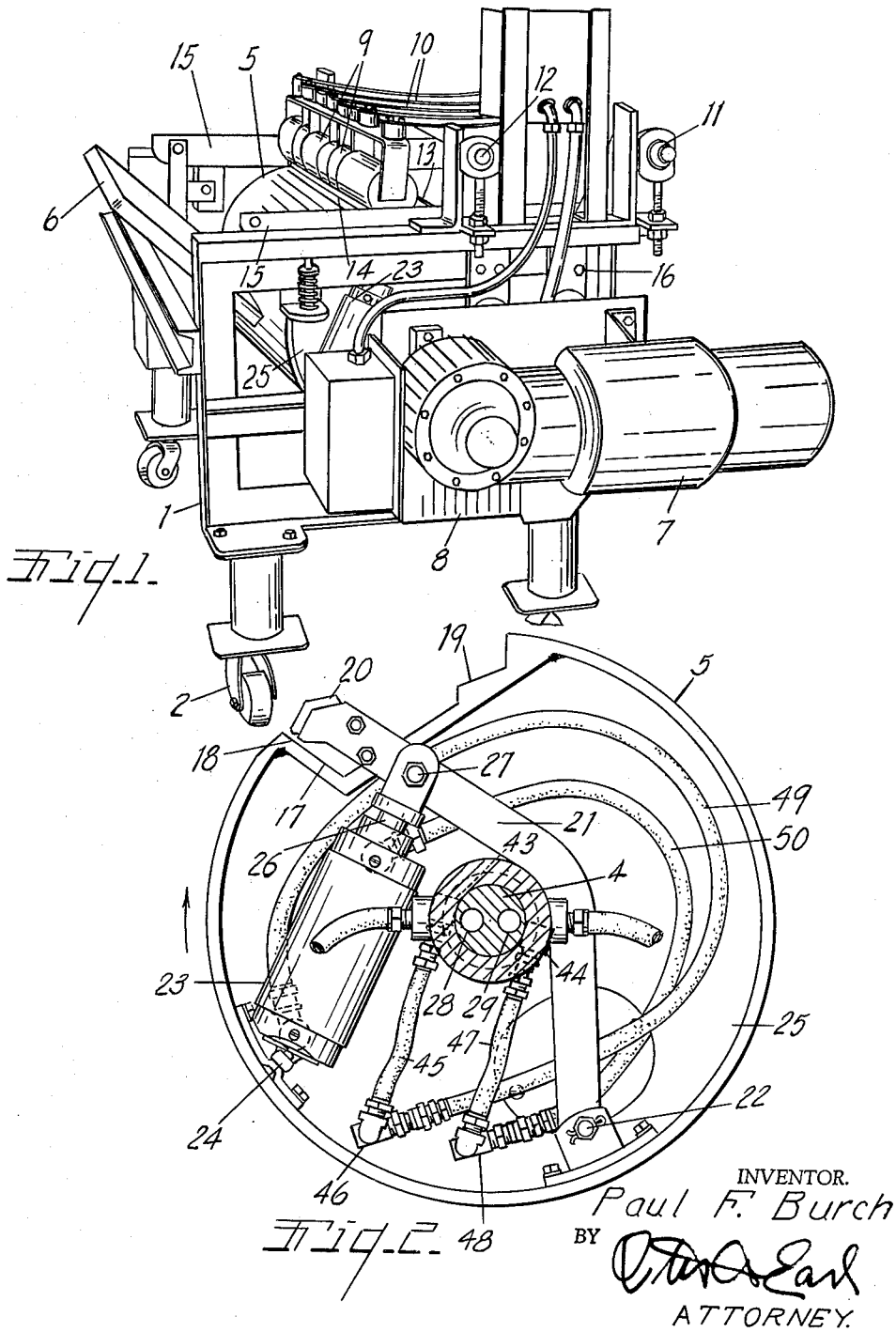
FIG. 1 is a fragmentary perspective view of the drive end of the machine.
FIG. 2 is a fragmentary end elevational view of the cylinder or roll of the machine viewed from the opposite end from FIG. 1 and taken along the plane of the line 2—2 in FIG. 4.

The machine of the present invention includes many of the elements of the machines of the above identified patents. Some of the elements of the prior machines particularly the controls and driving connections for some of the moving parts have been omitted from the drawings of this application in order to better illustrate the present invention.

The present machine includes a box-like framework 1 mounted on castors 2. Bearings 3 on the ends of the framework rotatably support the shaft 4 of a work cylinder or roll 5 extending transversely through the framework. A fixed apron or slideway 6 directs hogsides to the upwardly rotating side of the cylinder. An electric motor 7 and speed reduction transmission 8 mounted on one end of the framework are connected to rotate the cylinder.

Positioned above the cylinder 5 are a plurality of pressure rolls 9 yieldably supported on separate leaf springs 10. The ends of the springs are connected to a cross bar or shaft 11 which can be rocked by structure omitted from these drawings to raise and lower the pressure rolls 9. A second cross bar 12 engages the intermediate portions of the springs so that the springs can be preloaded in lowering the pressure rollers to a predetermined spacing above the cylinder.

Positioned between the cylinder 5 and the pressure rollers 9 is a rigid knife 13 having a cutting edge visible at 14 in FIG. 1. The ends of the knife are supported by rails 15 at each end of the framework and the rails are pivoted to the framework at 16. The left ends of the rails 15 as viewed in FIG. 1 are adjustably supported by mechanism also omitted from these drawings so that the knife can be raised or lowered with respect to the surface of the cylinder.

The structure thus far described, with the exception of the position of the slideway 6, is in general the structure of the identified prior patents and is described in greater detail therein.

The cylinder 5 has a longitudinally extending notch 17 in its surface with a radially extending clamping surface 18 along the trailing edge of the notch. A wiping or stripping surface 19 extends in generally chordal relation to the periphery of the cylinder along the leading edge of the notch. Extending longitudinally along the notch 17 is a rigid clamp bar 20 having its ends secured to arms 21 extending in angled transverse relation across the ends of the cylinder 5. The arms 21 are pivoted to the cylinder at 22 so that the clamp bar can be swung against the clamp surface 18 or over the wiping surface 19.

The clamp bar 20 is actuated by a pair of pneumatic cylinders 23 pivotally mounted at 24 with one cylinder at each end of the main work cylinder. The main work cylinder has generally circular bulkheads or end walls 25 that are recessed into the ends of the main cylinder and the actuating cylinders 23 and arms 21 are mounted in these recessed ends. The piston rods 26 of the cylinders 23 are pivoted to the arms at 27.

Figure 3:
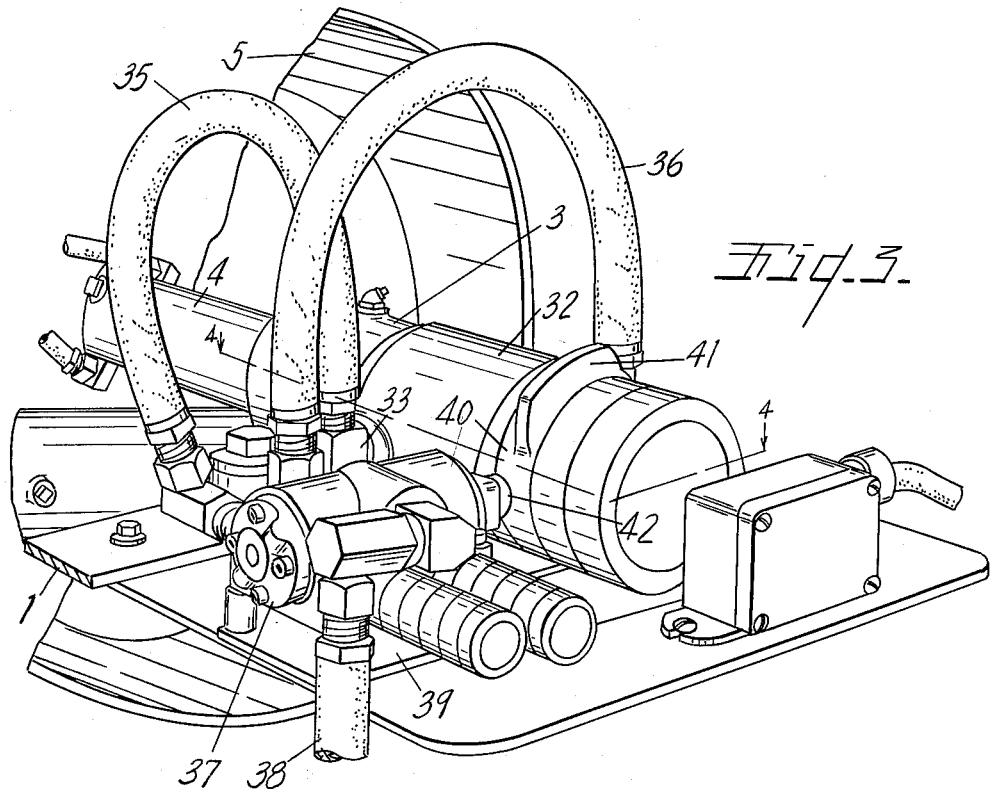
FIG. 3 is a fragmentary perspective view of the control end of the work cylinder or roll of the machine and the controls associated therewith.
Figure 4:
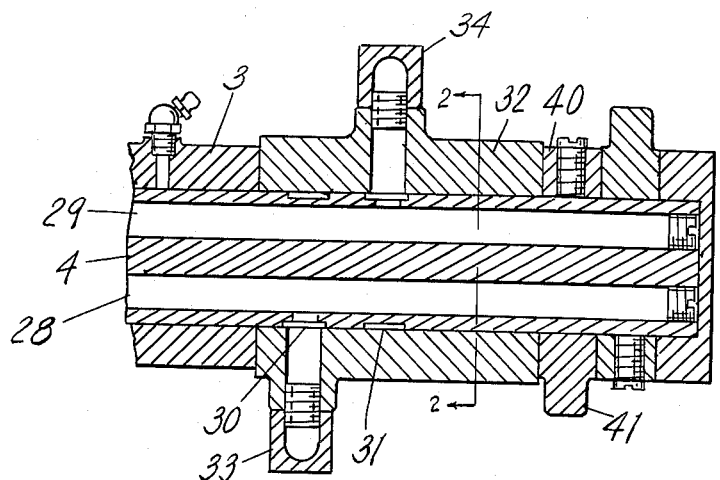
FIG. 4 is a fragmentary cross sectional view through the shaft of the work cylinder taken along the plane of the line 4—4 in FIG. 3.

In order to actuate the clamp bar operating cylinders 23 the end of the shaft 4 at the control end of the machine illustrated in FIGS. 2, 3 and 4 is bored with two air passages 28 and 29. Outwardly of the bearing 3 the passages communicate with annular grooves 30 and 31 enclosed in a fixed sleeve 32. The sleeve 32 has couplings 33 and 34 for air supply conduits 35 and 36 to a valve 37.

The valve 37 is supplied with air through a conduit 38 and is supported on a bracket or plate 39 alongside the shaft 4. A cam ring 40 secured on the shaft has a raised cam 41 thereon that coacts with a follower 42 on the valve 37 to shift the valve in timed relation to the rotation of the drum or cylinder 5.

Axially inwardly of the bearing 3, the shaft 4 has couplings 43 and 44 that communicate with the passages 28 and 29 and rotate with the shaft. As appears in FIG. 2 the coupling 43 is connected by a hose 45 to a fitting 46 on the end wall of the main cylinder. A hose 47 connects the coupling 44 to a fitting 48. Hoses 49 and 50 connect the fittings to opposite ends of the actuating cylinder 23. Pipes hidden behind the fittings 46 and 48 extend axially through the cylinder to similar fittings and hoses on the other end of the cylinder to simultaneously actuate a second cylinder 23 at the opposite end of the main cylinder.

The valve 37 is arranged to alternately admit air to the hose 35 or the hose 36 and the cam 41 is angularly adjusted to actuate the valve so that the piston rods of the actuating cylinders 23 are extended as the notch 19 moves upwardly towards the end of the apron or slideway 6. The fixed clamping surface 18 is thus exposed to receive the leading edge of a hog side delivered down the slideway. As the main cylinder continues to rotate the cam 41 actuates the valve to retract the pistons the cylinders 23. This moves the clamp bar 20 to tightly grip the edge of the hog side and draw the hog side under the knife 13 to cut the skin from the hog side.

A line of uncut fat and flesh is left on the radially inner side of the clamp bar 20 and as the clamp bar retracts on the next cycle of the machine this line or ridge of flesh is wiped off of the clamp bar by engagement with the wiping surface 19 at the leading edge of the notch. The relatively heavy line of fat and flesh thus drops from the notch 17 which is then on the underside of the cylinder and assists in stripping the freshly trimmed pig skin from the main cylinder.

Having thus described the invention, what is claimed as new and desired to be secured by Letters Patent is:

1. A machine for skinning hog sides comprising a supporting frame, a drum horizontally rotatably mounted in said frame and having a cylindrical periphery with a longitudinal notch formed completely therealong, a generally radially extending clamping surface at the trailing edge of said notch, means for rotating said drum in said frame, a fixed inclined feed apron mounted on said frame and positioned to direct a hog side to said notch as said clamping surface is generally horizontal on the upwardly rotating side of the drum, a pair of arms pivoted on the ends of said drum eccentric to its axis and swingable across the ends of said notch, a rigid clamp bar carried by the ends of said rods and swingable thereby against said clamping surface, air pressure actuated cylinders and piston rods connected between the ends of said drum and said arms to oscillate the arms, means including rotating seals rotated with said drum and coacting with fixed manifolds to provide pressure passages to said cylinders, a valve connected in said passages, a cam rotated with said drum and positioned to actuate said valve to retract said bar from said clamp surface as it approaches said apron and clamp the clamp bar against said surface after it leaves said apron, and a knife positioned closely adjacent said drum behind said apron to cut the meat from a hog side advanced thereagainst by the drum, said notch having a wiping edge extending therealong forwardly of said clamping surface to wipe across the inner side of said clamp bar and strip the edge of a skin therefrom as said clamp bar is retracted from said clamp surface.

2. A machine for skinning hog sides comprising a supporting frame, a drum horizontally rotatably mounted in said frame and having a cylindrical periphery with a longitudinal notch formed therealong, a generally radially extending clamping surface at the trailing edge of said notch, means for rotating said drum in said frame, a fixed inclined feed apron mounted on said frame and positioned to direct a hog side to said notch as said clamping surface is generally horizontal on the upwardly rotating side of the drum, a pair of arms pivoted on the ends of said drum eccentric to its axis and swingable across the ends of said notch, a rigid clamp bar carried by the ends of said rods and swingable thereby against said clamping surface, pressure actuated cylinders and piston rods connected between the ends of said drum and said arms to oscillate the arms, means including rotating seals rotated with said drum and coacting with fixed manfolds to provide pressure passages to said cylinders, a valve connected in said passages, a cam rotated with said drum and positioned to actuate said valve to retract said bar from said clamp surface as it approaches said apron and clamp the clamp bar against said surface after it leaves said apron, and a knife positioned closely adjacent said drum behind said apron to cut the meat from a hog side advanced thereagainst by the drum.

3. A machine for skinning hog sides comprising a supporting frame, a drum horizontally rotatably mounted in said frame and having a cylindrical periphery with a longitudinal notch formed completely therealong, a generally radially extending clamping surface at the trailing edge of said notch, means for rotating said drum in said frame, an inclined feed apron mounted on said frame and positioned to direct a hog side to said notch when said clamping surface is on the upwardly rotating side of the drum, a pair of arms pivoted on the ends of said drum and swingable across the ends of said notch, a rigid clamp bar carried by the ends of said rods and swingable thereby against said clamping surface, pressure actuated means connected between the ends of said drum and said arms to oscillate the arms, means including rotating seals rotated with said drum and coacting with fixed manifolds to provide pressure passages to said pressure actuated means, a valve connected in said passages, a cam rotated with said drum and positioned to actuate said valve to retract said bar from said clamp surface as it approaches said apron and clamp the clamp bar against said surface as it leaves said apron, and a knife positioned closely adjacent said drum behind said apron to cut the meat from a hog side advanced thereagainst by the drum, said notch having a wiping edge extending therealong forwardly of said clamping surface to wipe across the inner side of said clamp bar and strip the edge of a skin therefrom as said clamp bar is retracted from said clamp surface.

4. A machine for skinning hog sides comprising a supporting frame, a drum horizontally rotatably mounted in said frame and having a cylindrical periphery with a longitudinal notch formed therealong, a generally radially extending clamping surface at the trailing edge of said notch, means for rotating said drum in said frame, an inclined feed apron mounted on said frame and positioned to direct a hog side to said notch, a pair of arms pivoted on the ends of said drum and swingable across the ends of said notch, a rigid clamp bar carried by the ends of said rods and swingable thereby against said clamping surface, pressure actuated means connected between the ends of said drum and said arms to oscillate the arms, means including rotating seals rotated with said drum and coacting with fixed manifolds to provide pressure passages to said pressure actuated means, a valve connected in said passages, a cam rotated with said drum and positioned to actuate said valve to retract said bar from said clamp surface as it approaches said apron and clamp the clamp bar against said surface as it leaves said apron, and a knife positioned closely adjacent said drum behind said apron to cut the meat from a hog side advanced thereagainst by the drum.

References Cited in the file of this patent

UNITED STATES PATENTS

| | | |
|---|---|---|
| 638,238 | Haley et al. | Dec. 5, 1899 |
| 1,790,619 | Harding | Jan. 27, 1931 |
| 2,292,319 | Dziedzic | Aug. 4, 1942 |